F. TYSON.
ICE CREAM FREEZER.
APPLICATION FILED MAR. 23, 1915.
1,210,727.
Patented Jan. 2, 1917.
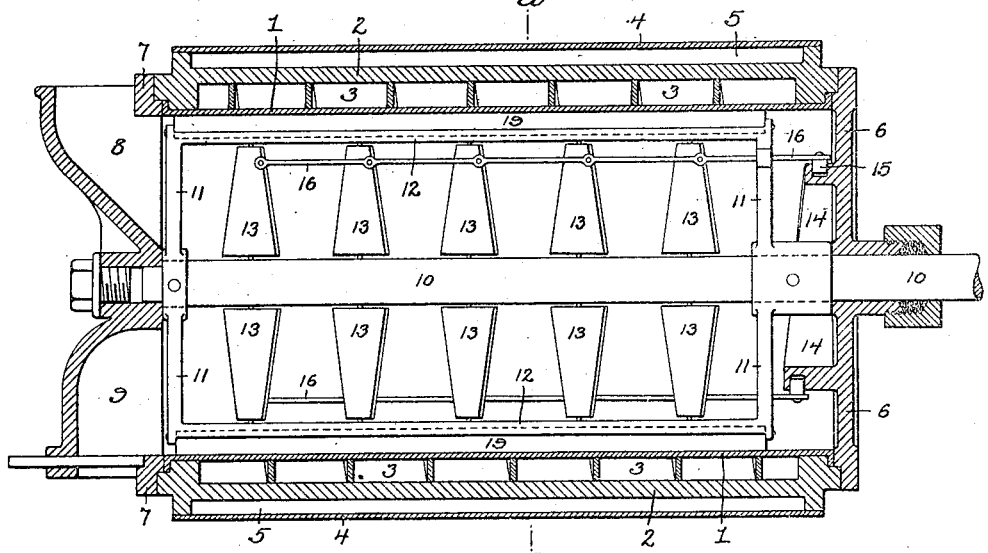
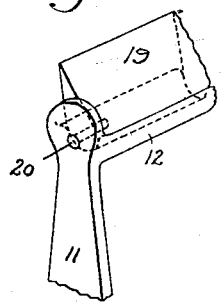
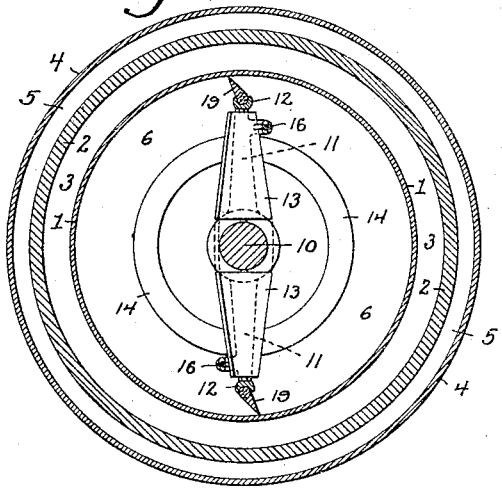
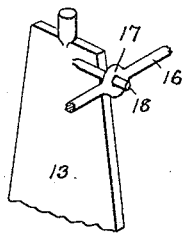
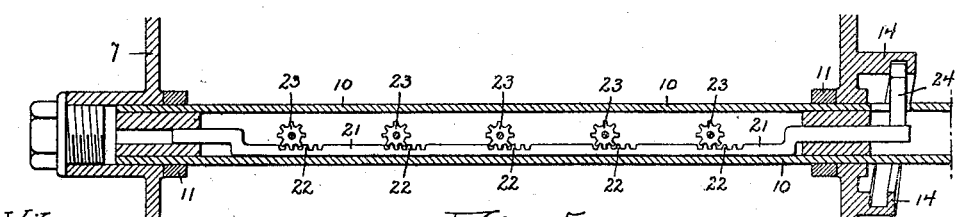
Witnesses
Inventor Frank Tyson
By his Attorney Harry Smith

UNITED STATES PATENT OFFICE.

FRANK TYSON, OF CANTON, OHIO.

ICE-CREAM FREEZER.

1,210,727.  Specification of Letters Patent.  Patented Jan. 2, 1917.

Application filed March 23, 1915. Serial No. 16,383.

*To all whom it may concern:*

Be it known that I, FRANK TYSON, a citizen of the United States, residing in Canton, Ohio, have invented certain Improvements in Ice-Cream Freezers, of which the following is a specification.

My invention relates to that class of ice cream freezers in which a cylindrical freezing vessel is provided with internal mechanism for beating, stirring and agitating the mass of cream during the freezing operation, the object of my invention being to increase the effectiveness of said beating, stirring or agitating operation as compared with machines at present in use. This object I attain in the manner hereinafter set forth, reference being had to the accompanying drawing, in which—

Figure 1 is a longitudinal section of a horizontal ice cream freezer constructed in accordance with my invention; Fig. 2 is a transverse section on the line $a$—$a$, Fig. 1; Figs. 3 and 4 are perspective views on a larger scale than Figs. 1 and 2 showing certain features of construction not clearly illustrated in the other figures, and Fig. 5 is a longitudinal sectional view illustrating a special means of accomplishing the object of my invention.

In the drawing I have shown my invention as applied to a horizontal ice cream freezer but my invention is not limited thereto but can be applied to ice cream freezers generally.

In Figs. 1 and 2, 1 represents the cylindrical freezing vessel which is contained within a cylindrical casing 2, the spiral chamber 3 intervening between the two for the flow of the refrigerant, and the casing 2 being surrounded by an outer casing 4 inclosing a chamber 5 for the reception of non-conducting material. The construction of the freezing vessel and its casing, is, however, immaterial to my invention and may be modified if desired. The freezing vessel is closed at its opposite ends by means of heads 6 and 7, the head 7 in the present instance having formed in it a filling and observation opening 8 and the valved discharge opening 9, and each head has a bearing for the driving shaft 10 of the machine, which carries inside of the freezing vessel a rectangular frame or dasher comprising end bars 11 and longitudinal bars 12. This frame also carries beating, stirring and agitating blades 13 (which will hereinafter, for convenience, be referred to simply as "beater blades") these blades in the freezer shown in the drawing being disposed in two sets, one on each side of the axis of the shaft 10, the blades of each set being arranged equi-distantly from end to end of the dasher and each beater blade being pivoted at its inner end in the shaft 10 and at its outer end in one of the bars 12 of the dasher so that the blade is free to assume different angles in respect to its plane of rotation with the dasher. Simultaneous rocking movement of all the blades of a series is effected by means of a cam structure 14 on the head 6 of the freezer, this cam structure acting upon rollers 15 carried by longitudinal rods 16 which have eyes 17 engaging projecting studs 18 on the beater blades 13, as shown in Fig. 4. Supposing that the freezing vessel and its opposite heads are stationary and the shaft 10 rotates, the rods 16 will rotate with the dasher and the engagement of the rollers 15 with the fixed cam 14 on the head 6 of the freezing vessel will, as said dasher rotates, impart back and forth reciprocating movement to the rod 16, which will in turn be transmitted to the beater blades 13 and will cause the same to rock on their axes so as to constantly shift the angular position of each blade in respect to its plane of rotation with the dasher. I thus not only avail myself of the beating action due to the rotation of the blades with the dasher but also provide a further beating action due to the constant vibration of the blades when they rotate, the result being a maximum volume of frozen product in proportion to the volume of the original charge. As the cream freezes on the inner surface of the freezing vessel 1 it must be removed therefrom and for this purpose the dasher is usually provided with scrapers which contact with the inner surface of the freezing vessel and remove the frozen volume of cream therefrom as fast as it is formed thereon. Two of such scrapers are shown in the drawing, mounted, respectively, in the opposite bars 12 of the dasher, each of these scrapers consisting of a wedge-shaped blade 19 interposed between the bar 12 and the inner face of the freezing vessel, this blade being of such width that it is compelled to assume a forwardly inclined position, as shown in Fig. 2. The outer edge of the blade is sharpened so as to properly perform its scraping duty but the inner edge or butt of the blade is thickened and rounded and is seated in the concave outer face of the dasher bar 12, displacement of the blade being prevented by means of pins 20 at the ends of the blade which enter openings in the outer portion of the arms 11, the latter closing the concave recess in the bars 12 at the end of the latter, as shown in Fig. 3.

In Fig. 5 I have illustrated a construction in which the cam 14 is disposed on the outer side of the head 6 instead of on the inner side of the same, the shaft 10 being tubular and being provided with means for the guidance of a longitudinal rack bar 21 which has racks 22 engaging with pinions 23 mounted upon the inner ends of the inner pivot studs of the beater blades 13 and contained within the hollow shaft 10, one end of the rack bar 21 having a projecting stud 24 which engages the cam groove formed in either face of the cam 14, as shown in Fig. 5, whereby as the shaft 10 is rotated longitudinal reciprocation will be imparted to the rack bar 21 with consequent back and forth movements of partial rotation of the pinions 23 and back and forth vibrations of the beater blades 13. While I prefer to extend the central rotating shaft 10 from end to end of the dasher and to pivotally mount the inner ends of the beater blades 13 in this portion of the shaft such construction is not necessary to my invention, and this portion of the shaft may, if desired, be dispensed with, in which case the oppositely disposed blades of Figs. 1 and 2 may be connected, as shown by dotted lines in Fig. 2, the single blade thus produced being pivotally mounted in the opposite bars 12 of the dasher, or, on the other hand, when the shaft 10 extends from end to end of the freezer the beater blades may be mounted entirely upon the same. While I also prefer to mount the vibrating beater blades upon a rotating dasher this feature also is not a matter of necessity, as my invention can, if desired, be embodied in a freezer in which the dasher is stationary and the rotative movement is imparted to the freezing vessel.

I claim:

1. An ice cream freezer having a freezing vessel and a pivoted beater blade therein, one rotatable in respect to the other, with means for automatically effecting a reversal in the angular position of said beater blade on each rotation of the rotating element of the freezer.

2. An ice-cream freezer having a freezing vessel and a pivoted row of beater blades therein, one of said elements being rotatable in respect to the other, and automatic means whereby, during each rotation of the rotatable element, reversal in the angular position of each of the beater blades of the row will be effected.

3. An ice cream freezer having a freezing vessel and a dasher therein, one rotatable in respect to the other, said dasher having longitudinal bars, pivotally mounted blades and automatic means whereby during the aforesaid rotative movement said beater blades will be caused to swing upon their axes.

4. An ice cream freezer having a freezing vessel and a dasher, one rotatable in respect to the other, and said dasher having longitudinal bars, with beater blades pivotally mounted in said longitudinal bars, and automatic means whereby, during the rotative movement, said beater blades are caused to swing upon their pivots.

5. An ice cream freezer having a freezing vessel and a dasher, one rotatable in respect to the other, said dasher having a central shaft, longitudinal bars, and swinging beaters pivotally mounted between the two, and automatic means whereby, during the aforesaid rotative movement, said blades are caused to swing upon their pivots.

6. An ice cream freezer having a swinging beater blade and a freezing vessel, one rotatable in respect to the other, a bar connected to said swinging beater blade, and a circular cam having the same relation to the beater blade as the freezing vessel, said cam acting directly upon said bar so as to effect reversal in the angular position of the beater blade on each rotation of the rotating element of the machine.

7. An ice cream freezer having a row of swinging beater blades and a freezing vessel, one of said elements being rotatable in respect to the other, a bar connecting the blades of the row, and a circular cam having the same relation to the beater blades as the freezing vessel, said cam acting directly upon said bar so as to cause a reversal in the angular position of each of the beater blades on each rotation of the rotative element of the machine.

In testimony whereof, I have signed my name to this specification, in the presence of two subscribing witnesses.

FRANK TYSON.

Witnesses:
RALPH S. AMBLER,
CLARA HERMANN.

Copies of this patent may be obtained for five cents each, by addressing the "Commissioner of Patents Washington, D. C."